United States Patent
Kang et al.

(10) Patent No.: US 12,185,336 B2
(45) Date of Patent: *Dec. 31, 2024

(54) METHOD AND APPARATUS FOR SUPPORTING MULTIPLE FREQUENCY ASSIGNMENT IN WIRELESS COMMUNICATION SYSTEM

(71) Applicant: Samsung Electronics Co., Ltd., Suwon-si (KR)

(72) Inventors: Hyun-Jeong Kang, Seoul (KR); Jae-Hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,306

(22) Filed: Jun. 9, 2023

(65) Prior Publication Data

US 2023/0319838 A1    Oct. 5, 2023

Related U.S. Application Data

(63) Continuation of application No. 17/355,764, filed on Jun. 23, 2021, now Pat. No. 11,678,331, which is a
(Continued)

(30) Foreign Application Priority Data

Apr. 22, 2009 (KR) .................. 10-2009-0034927
May 26, 2009 (KR) .................. 10-2009-0046146

(51) Int. Cl.
*H04W 4/00*     (2018.01)
*H04W 36/00*    (2009.01)
(Continued)

(52) U.S. Cl.
CPC ....... *H04W 72/23* (2023.01); *H04W 36/0016* (2013.01); *H04W 48/16* (2013.01);
(Continued)

(58) Field of Classification Search
None
See application file for complete search history.

(56) References Cited

U.S. PATENT DOCUMENTS 6,167,270 A    12/2000 Rezaiifar et al.
7,936,717 B2    5/2011 Cho et al.
(Continued)

FOREIGN PATENT DOCUMENTS

CN    1484398 A    3/2004
CN    1794625 A    6/2006
(Continued)

OTHER PUBLICATIONS

NTT DoCoMo, "Initial Access Procedure for Asymmetric Wider Bandwidth in LTE-Advanced", 3GPP TSG RAN WG1 Meeting #54bis, R1-083680, Oct. 2008, pp. 1-5, URL, http://www.3gpp.org/ftp/tsg_ran/wg1_rl1/TSGR1_54b/Docs/R1-083680.zip.
(Continued)

*Primary Examiner* — Mohammad S Adhami
(74) *Attorney, Agent, or Firm* — Jefferson IP Law, LLP

(57) ABSTRACT

A method and an apparatus for supporting multiple frequency assignments in a wireless communication system are provided. An operating method of a Mobile Station (MS) for supporting multicarrier transmission in a wireless communication system includes negotiating a multicarrier operation with a Base Station (BS) during a network entry procedure, when supporting a multicarrier operation mode with the BS, sending a first control message comprising information of every multicarrier configuration supported by the MS, to the BS, receiving a second control message comprising index
(Continued)

information of one or more carriers assigned for the multicarrier operation from the BS, and searching for configuration information of carriers corresponding to indexes of the one or more carriers assigned from the BS for the multicarrier operation.

16 Claims, 13 Drawing Sheets

Related U.S. Application Data continuation of application No. 15/707,320, filed on Sep. 18, 2017, now abandoned, which is a continuation of application No. 14/753,488, filed on Jun. 29, 2015, now Pat. No. 9,769,814, which is a continuation of application No. 12/765,328, filed on Apr. 22, 2010, now Pat. No. 9,072,031.

(51) Int. Cl.
  *H04W 48/16* (2009.01)
  *H04W 72/23* (2023.01)
  *H04W 48/12* (2009.01)
  *H04W 72/0453* (2023.01)
  *H04W 88/02* (2009.01)
  *H04W 88/08* (2009.01)

(52) U.S. Cl.
  CPC ........ *H04W 48/12* (2013.01); *H04W 72/0453* (2013.01); *H04W 88/02* (2013.01); *H04W 88/08* (2013.01)

(56) References Cited

U.S. PATENT DOCUMENTS

| | | | |
|---|---|---|---|
| 8,855,034 B2 | 10/2014 | Park et al. | |
| 9,769,814 B2 * | 9/2017 | Kang | H04W 36/0016 |
| 11,678,331 B2 * | 6/2023 | Kang | H04W 72/23 |
| | | | 370/329 |
| 2003/0007479 A1 | 1/2003 | Abrol et al. | |
| 2004/0029579 A1 | 2/2004 | Kashiwase | |
| 2007/0047431 A1 | 3/2007 | Nisho et al. | |
| 2008/0039090 A1 | 2/2008 | Jin et al. | |
| 2008/0132169 A1 | 6/2008 | Muramatsu | |
| 2008/0232316 A1 | 9/2008 | Cho et al. | |
| 2009/0016412 A1 | 1/2009 | Okamoto | |
| 2009/0116468 A1 | 5/2009 | Zhang et al. | |
| 2009/0180443 A1 * | 7/2009 | Kawasaki | H04W 56/0085 |
| | | | 370/331 |
| 2010/0220674 A1 | 9/2010 | Fu | |
| 2010/0272051 A1 | 10/2010 | Fu et al. | |
| 2011/0159903 A1 | 6/2011 | Yuk et al. | |
| 2011/0216730 A1 | 9/2011 | Kim et al. | |
| 2011/0249566 A1 | 10/2011 | Bergman et al. | |
| 2011/0261712 A1 | 10/2011 | Park et al. | |
| 2012/0093007 A1 | 4/2012 | Kang et al. | |

FOREIGN PATENT DOCUMENTS

| | | |
|---|---|---|
| CN | 1867131 A | 11/2006 |
| CN | 101179304 A | 5/2008 |
| CN | 101345988 A | 1/2009 |
| EP | 2618605 A1 | 7/2013 |
| JP | 2005-167502 A | 6/2005 |
| JP | 2007-259044 A | 10/2007 |
| JP | 2008-502272 A | 1/2008 |
| KR | 10-2008-0066898 A | 7/2008 |
| KR | 10-2008-0085991 A | 9/2008 |
| RU | 2335851 C2 | 10/2008 |
| WO | 03/005678 A1 | 1/2003 |
| WO | 2004039109 A1 | 5/2004 |
| WO | 2008/085009 A1 | 7/2008 |

OTHER PUBLICATIONS

Youngsoo Yuk et al., "Procedures for Multicarrier Support", IEEE 802.16 Broadband Wireless Access Working Group, Sep. 9, 2008, pp. 1-6.
Hsiao-Chen Lu, "Multi-Carrier Capability Negotiation and Carrier Assignment during Initial Network Entry and Network Reenty", Apr. 27, 2009, IEEE 802.16 Broadband Wireless Access Working Group, IEEE C802.16m-09/0965.
Korean Notice of Patent Grant dated Aug. 9, 2018, issued in a counterpart Korean application No. 10-2009-0046146.
Indian Office Action dated Sep. 10, 2018, issued in a counterpart Indian application No. 4280/KOLNP/2011.
Youngsoo Yuk et al.; Procedures for Multicarrier Support; IEEE 802.16 Broadband Wireless Access Working Group; Sep. 9, 2008; pp. 1-6; http://ieee802.org/16.
Extended European Search Report dated Jan. 22, 2019, issued in European Application No. 18200338.4.
European Search Report dated Oct. 2, 2019; European Appln. No. 18 200 338.4-1215.
Malaysian Office Action dated Jul. 29, 2020; Malaysian Appln. No. PI2011005039.

* cited by examiner

METHOD AND APPARATUS FOR SUPPORTING MULTIPLE FREQUENCY ASSIGNMENT IN WIRELESS COMMUNICATION SYSTEM

CROSS-REFERENCE TO RELATED APPLICATION(S)

This application is a continuation application of a prior application Ser. No. 17/355,764, filed on Jun. 23, 2021, which is a continuation application of a prior application Ser. No. 15/707,320, filed on Sep. 18, 2017, which is a continuation application of prior application Ser. No. 14/753,488, filed on Jun. 29, 2015, which has issued as U.S. Pat. No. 9,769,814 on Sep. 19, 2017, which is a continuation application of a prior application Ser. No. 12/765,328, filed on Apr. 22, 2010, which has issued as U.S. Pat. No. 9,072,031 on Jun. 30, 2015, which claimed the benefit under 35 U.S.C. § 119(a) of a Korean patent application filed on Apr. 22, 2009 in the Korean Intellectual Property Office and assigned Serial number 10-2009-0034927, and of a Korean patent application filed on May 26, 2009 in the Korean Intellectual Property Office and assigned Serial number 10-2009-0046146, the entire disclosures of each of which is hereby incorporated by reference.

BACKGROUND OF THE INVENTION

1. Field of the Invention

The present invention relates to a wireless communication system. More particularly, the present invention relates to a method and an apparatus for processing multiple Frequency Assignment (FA) configuration information to support an overlay mode.

2. Description of the Related Art

As wireless communication systems advance, types of services and an amount of traffic provided by the wireless communication systems are increasing. To meet those demands, various wireless communication technologies are suggested. Among them, an Orthogonal Frequency Division Multiplexing (OFDM) or Orthogonal Frequency Division Multiple Access (OFDMA) scheme is under development as the most prominent next-generation wireless communication technique. A Wireless Metropolitan Area Network (WMAN) of the Institute of Electrical and Electronics Engineers (IEEE) standard 802.16 is also adopting the OFDM or OFDMA as its standard.

Meanwhile, since frequency resources are limited in the wireless communication systems, available frequency bands are also restricted. By modifying the standard, the wireless communication systems are evolving to provide a higher data rate than the existing systems and to address implementation issues. In a course of the evolution, various systems can coexist in the same area according to their compatibility with the existing systems.

FIG. 1 is a diagram of a structure supporting a single frequency band and a structure supporting two frequency bands in a wireless communication system according to the related art.

In the wireless communication system, in particular, in a broadband wireless communication system represented by the IEEE standard 802.16, a Base Station (BS) operates using one Frequency Assignment (FA) or two or more FAs. The BS offers a radio channel to a Mobile Station (MS) through its FA.

Referring FIG. 1, an MS 100 can move from a FA1 region 120 to a FA2 region 140, which is referred to as a handover between the FAs. Herein, the FA1 region 120 indicates a service coverage area where the MS 100 receives a wireless communication service using the FA1, and the FA2 region 140 indicates a service coverage area where the MS 100 receives the wireless communication service using the FA2. When the MS 100 traveling in the FA1 region 120 can operate in only one FA or the FA1 and the FA2 are provided by different BSs, the MS 100 hands over between the FAs and then receives the radio channel using the FA2.

For high data rate transmission, when an MS 150 operates in two or more FAs or the two or more FAs are provided by a single BS, the MS 150 can use the radio channel through all of the FA1 region 160 and the FA2 region through the FA_n 180. As such, the MS and the BS can transmit and receive large amounts of data at a high data rate by using the plurality of the FA_1 through the FA_n. Hereinafter, the technique for using the existing multiple FAs without allocating a new frequency band is referred to as a frequency overlay. In the wireless communication system, it is necessary to share information (e.g., a center frequency of the FA, a bandwidth of the FA, and an offset of the FA) relating to every FA supporting the frequency overlay.

Thus, a need exists for a method and apparatus for efficiently processing configuration information of the multiple FAs supporting the frequency overlay in the wireless communication system.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for supporting frequency overlay in a wireless communication system.

Another aspect of the present invention is to provide a method and an apparatus for efficiently processing configuration information of multiple FAs supporting frequency overlay in a wireless communication system.

In accordance an aspect of the present invention, an operating method of a Mobile Station (MS) for supporting multicarrier transmission in a wireless communication system. The method includes negotiating a multicarrier operation with a Base Station (BS) during a network entry procedure, receiving configuration information of available carriers from the BS, determining one or more carrier indexes for the multicarrier operation, and searching for configuration information corresponding to the one or more carrier indexes.

In accordance with another aspect of the present invention, an operating method of a BS for supporting multicarrier transmission in a wireless communication system is provided. The method includes negotiating a multicarrier operation with an MS during a network entry procedure, broadcasting configuration information of available carriers to the MS, and searching for configuration information corresponding to one or more carrier indexes.

In accordance with yet another aspect of the present invention, an operating method of an MS for supporting multicarrier transmission in a wireless communication system is provided. The method includes negotiating a multicarrier operation with a BS in course of a network entry procedure, receiving configuration information of available carriers from the BS, notifying the BS of the reception of the configuration information of the available carriers, receiving one or more active carrier indexes for the multicarrier operation from the BS, and searching for configuration information corresponding to the one or more active carrier indexes for an overlay mode.

In accordance with still another aspect of the present invention, an operating method of a BS for supporting multicarrier transmission in a wireless communication system is provided. The method includes negotiating a multicarrier operation with an MS during a network entry procedure, broadcasting configuration information of available carriers to the MS, receiving a message which notifies of reception of the configuration information of the available carriers, from the MS, indicating one or more active carrier indexes for the multicarrier operation to the MS, and searching for configuration information corresponding to the one or more active carrier indexes for the multicarrier operation.

In accordance with a further aspect of the present invention, an operating method for supporting multicarrier transmission in a wireless communication system is provided. The method includes negotiating, at a BS and an MS, a multicarrier operation during a network entry procedure, determining, at the MS, one or more carrier indexes for the multicarrier operation, and searching for configuration information corresponding to the one or more carrier indexes for the multicarrier operation using a carrier configuration information table.

In accordance with a further aspect of the present invention, a wireless communication system for supporting multicarrier transmission is provided. The system includes an MS for negotiating a multicarrier operation with a BS during a network entry procedure, receiving configuration information of available carriers from the BS, and determining one or more carrier indexes for the multicarrier operation, and the BS for, in course of the network entry procedure, determining the multicarrier operation, broadcasting the configuration information of the available carriers, allocating one or more Frequency Assignment (FA) indexes for the multicarrier operation, and searching for configuration information corresponding to the one or more carrier indexes for an overlay mode.

In accordance with a further aspect of the present invention, an operating method of an MS for supporting multicarrier transmission in a wireless communication system is provided. The method includes sending a first control message for supporting a multicarrier operation to a BS during a network entry procedure, receiving a second control message including index information of one or more carriers allocated for the multicarrier operation, from the BS, and searching for configuration information of carriers corresponding to indexes of one or more FAs allocated from the BS for an overlay mode.

In accordance with still a further aspect of the present invention, an operating method of an MS for supporting multicarrier transmission in a wireless communication system is provided. The method includes sending a first control message informing of whether a multicarrier operation is supported, to a BS during a network entry procedure, when supporting the multicarrier operation, sending a second control message including index information of one or more available carriers for a multicarrier operation from the BS, to the BS, receiving a third control message including index information of one or more carriers allocated for the multicarrier operation, from the BS, and searching for configuration information of carriers corresponding to one or more carrier indexes allocated from the BS for the multicarrier operation.

In accordance with still a further aspect of the present invention, an operating method of a BS for supporting multicarrier transmission in a wireless communication system is provided. The method includes receiving a first control message for supporting a multicarrier operation from an MS during a network entry procedure, selecting one or more carriers for the multicarrier operation based on the first control message, and sending a second control message including index information of the selected carriers to the MS.

In accordance with a further aspect of the present invention, an operating method of a BS for supporting multicarrier transmission in a wireless communication system is provided. The method includes receiving a first control message informing of whether a multicarrier operation is supported, from an MS during a network entry procedure, when the multicarrier operation is supported, receiving a second control message including index information of one or more carriers allocated from the BS for the multicarrier operation, to the MS, selecting one or more carriers for the multicarrier operation based on the second control message, and sending a third control message including index information of the selected carriers to the MS.

In accordance with a further aspect of the present invention, an operating method of an MS for supporting multicarrier transmission in a wireless communication system is provided. The method includes negotiating a multicarrier operation with a BS during a network entry procedure, when supporting a multicarrier operation mode with the BS, sending a first control message including information of every multicarrier configuration supported by the MS, to the BS, receiving a second control message including index information of one or more carriers assigned for the multicarrier operation from the BS, and searching for configuration information of carriers corresponding to indexes of the one or more carriers assigned from the BS for the multicarrier operation.

In accordance with yet another aspect of the present invention, an operating method of a BS for supporting multicarrier transmission in a wireless communication system is provided. The method includes negotiating a multicarrier operation with an MS during a network entry procedure, when supporting a multicarrier operation mode with the MS, receiving a first control message including information of every multicarrier configuration supported by the MS, from the MS, selecting one or more carriers for the multicarrier operation based on the first control message, and sending a second control message including index information of the selected carriers to the MS.

In accordance with still a further aspect of the present invention, a system for supporting multicarrier transmission in a wireless communication system is provided. The system includes an MS for negotiating a multicarrier operation with a BS during a network entry procedure, when supporting a multicarrier operation mode with the BS, sending a first control message including information of every multicarrier configuration supported by the MS, to the BS, and receiving a second control message including index information of one or more carriers assigned for the multicarrier operation from the BS, and the BS for sending the one or more carriers assigned for the multicarrier operation to the MS based on the first control message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for processing configuration information of each of multiple Frequency Assignments (FAs) supporting an overlay mode in a wireless communication system.

Hereinafter, a mode for a Mobile Station (MS) and a Base Station (BS) to transmit and receive signals using the multiple FAs is referred to as an overlay mode. A wireless communication system in the overlay mode is referred to as an overlay communication system.

Figure 1:
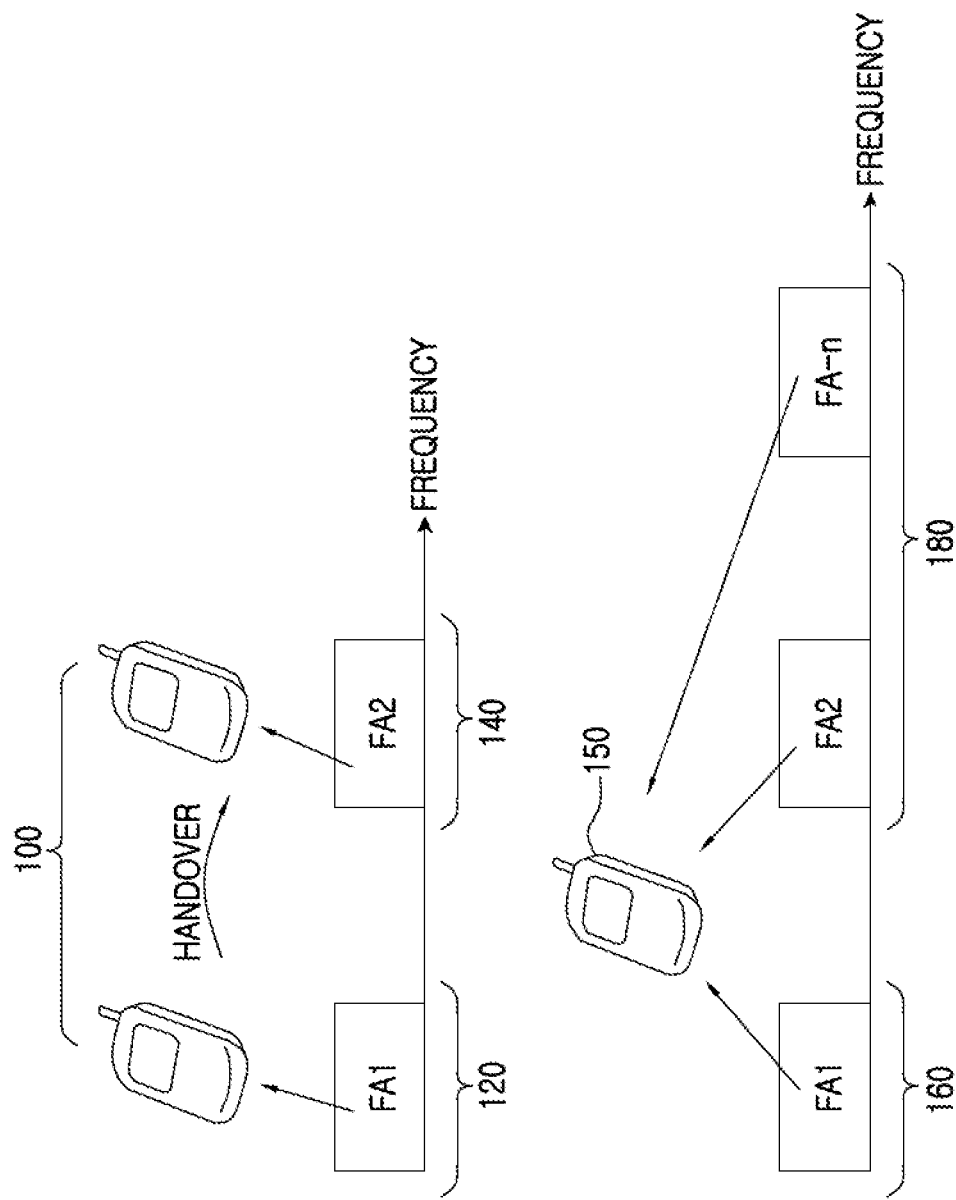
FIG. 1 is a diagram of a structure supporting a single frequency band and a structure supporting two frequency bands in a wireless communication system according to the related art.
Figure 2:
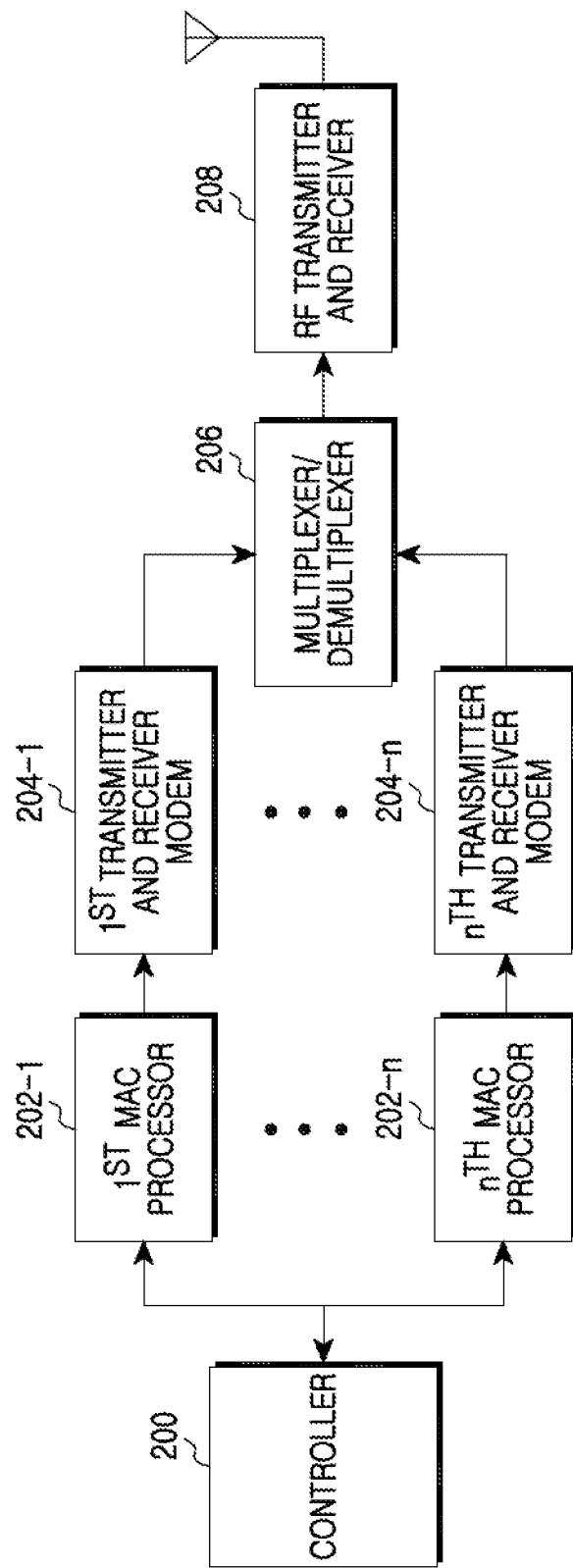
FIG. 2 is a block diagram of a Mobile Station (MS) for supporting an overlay mode in a wireless communication system according to an exemplary embodiment of the present invention.

FIG. 2 is a block diagram of an MS for supporting an overlay mode in a wireless communication system according to an exemplary embodiment of the present invention.

Referring to FIG. 2, the MS includes a controller 200, a first Media Access Control (MAC) processor 202-1 through an n-th MAC processor 202-$n$, a first transmitter and receiver modem 204-1 through an n-th transmitter and receiver modem 204-$n$, a multiplexer and demultiplexer 206, and a Radio Frequency (RF) transmitter and receiver 208.

The controller 200 controls operations of the MS. The controller 200 controls to set an overlay mode using an FA index for the overlay determined in a network entry procedure and configuration information relating to every FA acquired through a broadcast channel. In more detail, the controller 200 determines configuration information corresponding to the FA index for the determined overlay, from the configuration information relating to every FA acquired over the broadband channel, and sets the overlay mode using the determined configuration information. The controller 200 controls the first MAC processor 202-1 through the n-th MAC processor 202-$n$ to process transmit data from a higher layer (e.g., Internet Protocol (IP) layer), or controls to forward MAC layer data from the first MAC processor 202-1 through the n-th MAC processor 202-$n$ to the higher layer.

The first MAC processor 202-1 processes the transmit data from the higher layer (e.g., the IP layer) in the MAC layer and transmits the processed transmit data to the first transmitter and receiver modem 204-1 under the control of the controller 200. The first MAC processor 202-1 functions to generate and analyze a control message required for the signaling. For example, the first MAC processor 202-1 generates readiness indicator information relating to the FA for the determined overlay mode under the control of the controller 200. According to an exemplary embodiment, the first MAC processor 202-1 receives the configuration information of every FA, generates an ACKnowledgement (ACK) message accordingly, and generates the readiness indicator information for the active FA.

Under the control of the controller 200, the first MAC processor 202-1 processes data from the first transmitter and receiver modem 204-1 in the MAC layer and transmits the processed data to the higher layer. The first MAC processor 202-1 analyzes a broadcast message including the configuration information of every FA received from the BS and a control message including the information of the FA for the overlay mode, and provides the analyzed information to the controller 200. According to an exemplary embodiment, the first MAC processor 202-1 analyzes an indication message for the active FA received from the BS and provides the analyzed message to the controller 200.

In a transmission mode, the first transmitter and receiver modem 204-1 encodes the data (burst data) from the first MAC processor 202-1 in a physical layer under the control of the controller 200. In a reception mode, the first transmitter and receiver modem 204-1 decodes a signal from the demultiplexer 206 in the physical layer.

For example, the first transmitter and receiver modem 204-1 includes a channel encoding block, a modulating block, and so on for modulating the signal from the first MAC processor 202-1 in the baseband. Herein, the channel encoding block includes a channel encoder, an interleaver, and a modulator. The modulating block may include an Inverse Fast Fourier Transform (IFFT) operator for loading the transmit data to a plurality of orthogonal subcarriers. Given an OFDMA system, the modulating block of the first transmitter and receiver modem 204-1 may include an FFT operator for extracting data from the subcarriers, and the channel decoding block may include a demodulator, a deinterleaver, and a channel decoder.

The first MAC processor 202-1 and the first transmitter and receiver modem 204-1 are components for the communication using the FA1 and are controlled by the controller 200. The n-th MAC processor 202-$n$ and the n-th transmitter and receiver modem 204-$n$ are components for the communication using the FA_n and are controlled by the controller 200. A number of the FAs used in the overlay mode is determined by the controller 200.

The multiplexer 206 multiplexes signals from the first transmitter modem 204-1 through the n-th transmitter modem 204-$n$. The demultiplexer 206 forwards signals from the RF transmitter and receiver 208 to the first transmitter and receiver modem 204-1 through the n-th transmitter and receiver modem 204-$n$ at the same time, or to one or some selected from the first transmitter and receiver modem 204-1 through the n-th transmitter and receiver modem 204-$n$ under the control of the controller 200.

The RF transmitter and receiver 208 converts the signals output from the multiplexer 206 into an RF signal and transmits the RF signals via an antenna. The RF transmitter and receiver 208 converts signals received over the antenna into a baseband signal.

Meanwhile, the physical layer encoding scheme in the first transmitter and receiver modem 204-1 through the n-th transmitter and receiver modem 204-$n$ is similar. Hence, the first transmitter and receiver modem 204-1 through the second transmitter and receiver modem 204-$n$ can be implemented as a single device.

Figure 3:
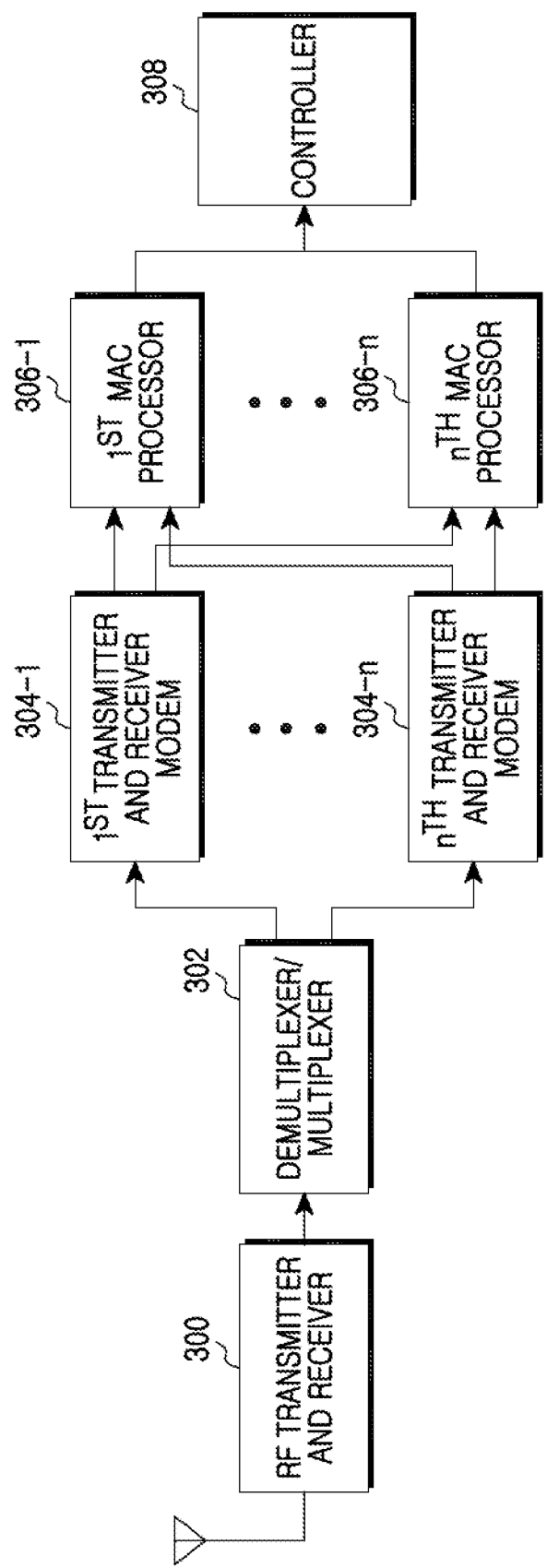
FIG. 3 is a block diagram of a Base Station (BS) for supporting an overlay mode in a wireless communication system according to an exemplary embodiment of the present invention.

FIG. 3 is a block diagram of a BS for supporting an overlay mode in a wireless communication system according to an exemplary embodiment of the present invention.

Referring to FIG. 3, the BS includes an RF transmitter and receiver 300, a multiplexer and demultiplexer 302, a first transmitter and receiver modem 304-1 through an n-th transmitter and receiver modem 304-$n$, a first MAC processor 306-1 through an n-th MAC processor 306-$n$, and a controller 308.

The controller 308 controls operations of the BS. The controller 308 controls an overlay mode operation by determining the FAs for the overlay mode with the corresponding MS in the network entry procedure. The controller 308 controls the first MAC processor 306-1 through the n-th MAC processor 306-$n$ to process transmit data from a higher layer (e.g., the IP layer), or controls to forward MAC layer data from the first MAC processor 306-1 through the n-th MAC processor 306-$n$ to the higher layer. The controller 308 controls to generate and transmit various control signals (preamble, FCH, MAP, etc.) and controls to transmit and receive data.

During a network entry, the controller 308 determines the overlay mode and assigns one or more FA indexes for the overlay mode. The controller 308 broadcasts configuration information relating to every FA over the broadcast channel.

Under the control of the controller 308, the first MAC processor 306-1 processes the transmit data from the higher layer (e.g., the IP layer) in the MAC layer and outputs the processed transmit data to the first transmitter and receiver modem 304-1. The first MAC processor 306-1 serves to generate and analyze a control message required for the signaling. For example, the first MAC processor 306-1 analyzes a readiness indicator message relating to the FAs for the determined overlay mode and a readiness indicator message relating to the active FA and provides the analyzed message to the controller 308 under the control of the controller 308. The first MAC processor 306-1 analyzes an ACK message for the configuration information of every FA and provides the analyzed message to the controller 308.

The first MAC processor 306-1 processes data from the first transmitter and receiver modem 304-1 in the MAC layer and outputs the processed data to the higher layer under the control of the controller 308. The first MAC processor 306-1 analyzes the readiness indicator message relating to the FA received from the MS and the ACK message for the configuration information of every FA and provides the analyzed messages to the controller 308.

In a transmission mode, the first transmitter and receiver modem 304-1 encodes the data (burst data) from the first MAC processor 306-1 in the physical layer under the control of the controller 308. In a reception mode, the first transmitter and receiver modem 304-1 decodes a signal from the demultiplexer and multiplexer 302 in the physical layer.

For example, the first transmitter and receiver modem 304-1 includes a channel encoding block and a modulating block, and modulates the signal from the first MAC processor 306-1 in the baseband. Herein, the channel encoding block includes a channel encoder, an interleaver, and a modulator. The modulating block may include an IFFT operator for loading the transmit data to a plurality of orthogonal subcarriers. Given an OFDMA system, the modulating block of the first transmitter and receiver modem 304-1 may include an FFT operator for extracting data from the subcarriers, and the channel decoding block can include a demodulator, a deinterleaver, and a channel decoder.

The first MAC processor 306-1 and the first transmitter and receiver modem 304-1 are components for the communication using the FA1 and are controlled by the controller 308. The n-th MAC processor 306-$n$ and the n-th transmitter and receiver modem 304-$n$ are components for the communication using the FA_n and are controlled by the controller 308. A number of the FAs used in the overlay mode is determined by the controller 308.

The demultiplexer and multiplexer 302 multiplexes the signals from the first transmitter and receiver modem 304-1 through the n-th transmitter and receiver modem 304-n. The demultiplexer and multiplexer 302 forwards a signal from the RF transmitter and receiver 300 to the first transmitter and receiver modem 304-1 through the n-th transmitter and receiver modem 304-n at the same time, or to one or some selected from the first transmitter and receiver modem 304-1 through the n-th transmitter and receiver modem 304-n under the control of the controller 308.

The RF transmitter and receiver 300 converts the signal output from the demultiplexer and multiplexer 302 into an RF signal and transmits the RF signal via an antenna. The RF transmitter and receiver 300 converts a signal received over the antenna into a baseband signal.

Meanwhile, the physical layer encoding scheme in the first transmitter and receiver modem 304-1 through the n-th transmitter and receiver modem 304-n is similar. Hence, the first transmitter and receiver modem 304-1 through the n-th transmitter and receiver modem 304-n can be implemented as a single device.

Figure 4:
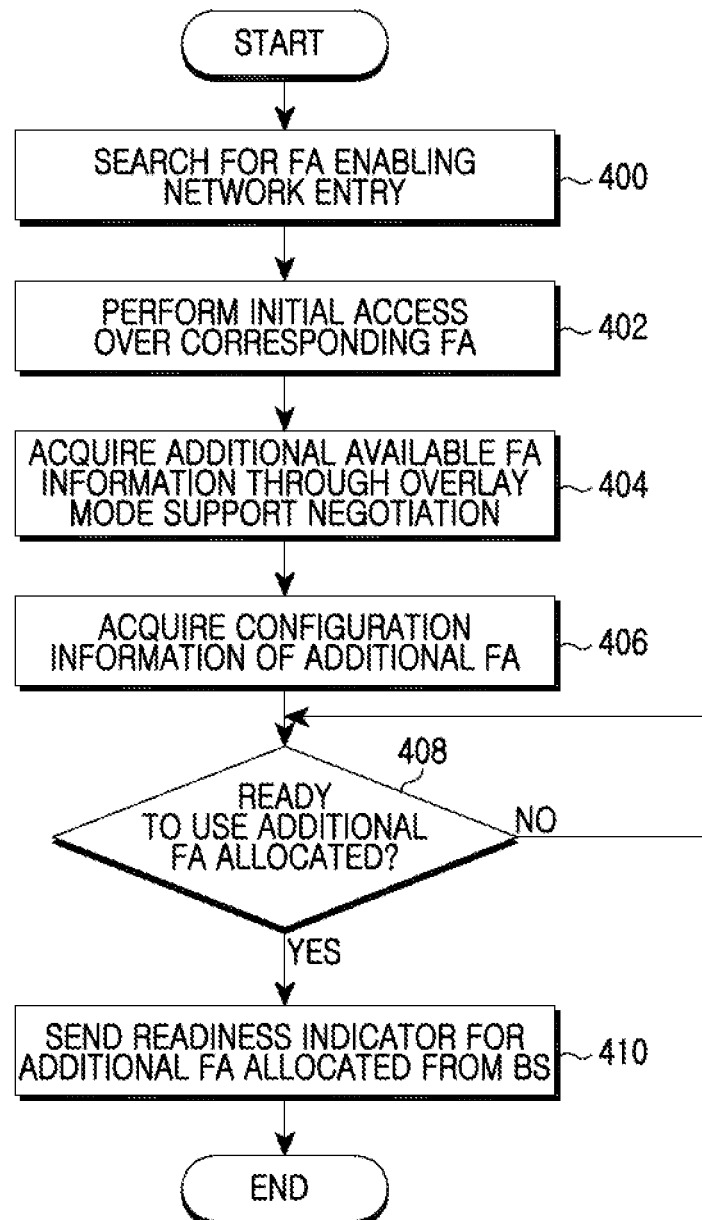
FIG. 4 is a flowchart of operations of an MS for supporting an overlay mode in a wireless communication system according to an exemplary embodiment of the present invention.

FIG. 4 is a flowchart of operations of an MS for supporting an overlay mode in a wireless communication system according to an exemplary embodiment of the present invention.

Referring to FIG. 4, it is assumed that the overlay communication system includes an MS and a BS and the BS operates two or more FAs; that is, a primary FA and at least one secondary FA.

The FAs include an FA available to the BS (hereafter, referred to as an available FA), an FA assigned to the MS of the overlay mode (hereafter, referred to as an assigned FA), and an FA actually used for the MS of the overlay mode to transmit and receive data (hereafter, referred to as an active FA). The assigned FA and the active FA can be identical. Alternatively, the active FA can be a subset of the assigned FA.

In step 400, the MS searches for the FA for an initial network entry to the BS. That is, the MS synchronizes by searching for the center frequency of the FA.

In step 402, the MS performs a network entry procedure through the found FA. Using a synchronization procedure and an initial ranging procedure, the MS sets a power offset value and a timing offset value to appropriate values.

In step 404, the MS performs a basic capability negotiation during the network entry. For example, the MS negotiates the basic capabilities by sending a subscriber Station (SS) Basic Capability Request (SBC-REQ) message or a Registration Request (REG-REQ) message to the BS and receiving a SS Basic Capability Response (SBC-RSP) message or a Registration Response (REG-RSP) message from the BS.

In a process of basic capability negotiation, the MS informs the BS of whether the overlay mode is supported using the SBC-REQ message or the REG-REQ message, and receives information relating to the FA to use in the overlay mode from the BS using the SBC-RSP message or the REG-RSP message. The information relating to the FA to use in the overlay mode in the basic capability negotiation includes at least one of the number of FAs supportable by the MS, the overlay mode supported by the MS, FA index information to be used by the MS, FA interval information (the interval between two FAs in frequency domain), band class information, and bandwidth The overlay mode includes information as to whether the MS supports an FA aggregation mode or an FA switching mode, information as to whether the MS supports a PHY segmentation mode or a MAC segmentation mode, and information as to whether the MS supports the overlay mode only for the contiguous FA or the non-contiguous.

The FA index information may include physical carrier index information of the FA in the BS, and logical carrier index information for the FA applied only to the MS. While the BS may send configuration information (e.g., the center frequency of the FA, the bandwidth of the FA, the offset of the FA, and so on) of the FA supporting the overlay mode to the MS using the SBC-RSP message or the REG-RSP message, the size of the SBC-RSP message or the REG-RSP message increases. However, as sending the SBC-RSP message or the REG-RSP message to each of the MSs, this can be overhead to the BS. Thus, in the basic capability negotiation, the BS receives only the FA index information with respect to the multiple FAs supporting the overlay mode. Namely, the BS does not receive the detail configuration information of the multiple FAs supporting the overlay mode.

In step 406, the MS receives the configuration information of every FA from the BS in the process of the network entry. The configuration information of the FA may be transmitted over the broadcast channel (or using the broadcast message) of the BS. The configuration information of the FA may include the physical carrier index information of the FA, the center frequency of the FA, the bandwidth of the FA, and the offset information of the FA. Herein, only the center frequency, the bandwidth, and the offset information may be carried by the broadcast channel (or the broadcast message), except for the FA index information. If the MS is implicitly aware of the index information of the FA corresponding to the FA configuration information of the FA, the FA index information may be omitted in the configuration information of the FA. That is, the index of each FA may follow the order of the FA configuration information in the broadcast channel (or the broadcast message).

As above, the MS supporting the overlay mode acquires the information of which FA is used to communicate with the BS and the configuration information of the FA to use in steps 404 and 406. In more detail, the MS may acquire brief information such as index information of the FA to use in step 404, and the MS may acquire detailed information of the FA from the configuration information broadcast from the BS in step 406.

When the MS receives the configuration information of the FA broadcast by the BS in step 406 after the overlay mode support negotiation of the basic capability negotiation process of step 404, the MS may be able to acquire the FA configuration information of step 406 before step 404. Using the SBC-REQ message or the REG-REQ message exchanged in the overlay mode support negotiation process of the basic capability negotiation of step 404, the MS may send an indicator of the reception of the FA configuration information message to the BS. When receiving an indicator of no reception of the FA configuration information message, the BS may transmit the FA configuration information together with the index information of the FA to be used by the MS using the SBC-RSP message or the REG-RSP message.

Alternatively, when the MS and the BS keep the FA configuration information as a table, there is no need to send the configuration information of every FA using the broadcast message. The MS may retrieve the configuration information corresponding to the FA index supporting the determined overlay mode in the basic capability negotiation from the table.

By retrieving the configuration information corresponding to the FA index of step 404 from the configuration information of every FA received using the broadcast message in step 406, the MS processes to transmit and receive data using the indicated FA of step 404 in step 408. Step 408 applies the code-based ranging process on the FA when it is necessary to acquire the synchronization or to regulate the frequency/time/power offset to transmit and receive the data using the FA, rather than the network entry procedure over the FA.

When the MS is ready to use the FA for the overlay mode in step 408, the MS signals the BS to inform of the readiness for the data transmission and reception with the BS using the FA for the overlay mode in step 410. Herein, the signaling to inform of the readiness for the data transmission and reception using the FA is outside the scope of exemplary embodiments of the present invention and thus a more detailed description of thereof shall be omitted here.

Next, the MS finishes this process.

Figure 5:
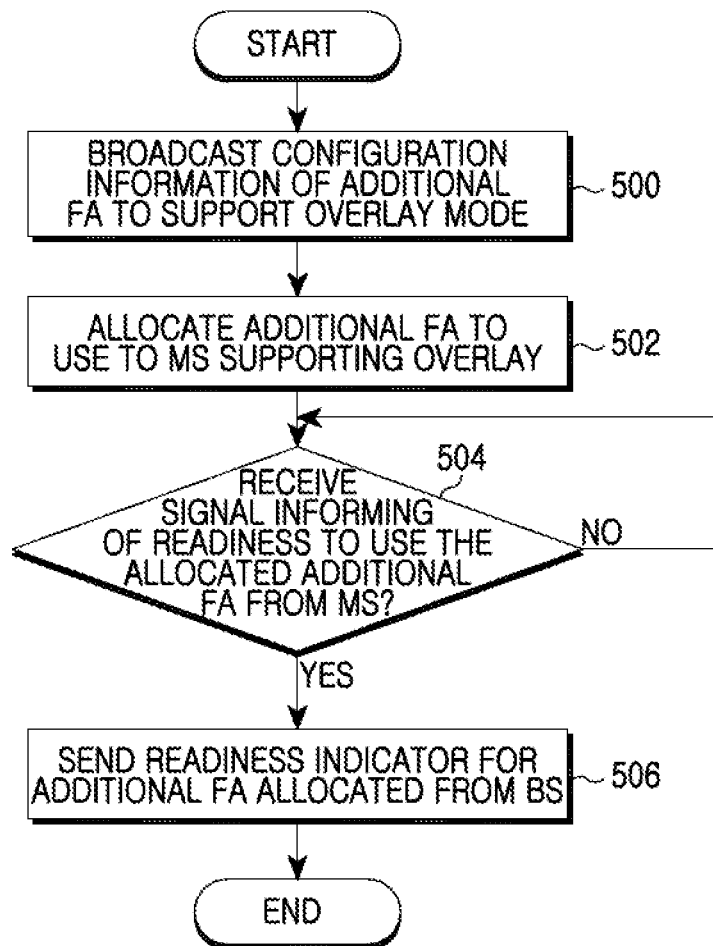
FIG. 5 is a flowchart of operations of a BS for supporting an overlay mode in a wireless communication system according to an exemplary embodiment of the present invention.

FIG. 5 is a flowchart of operations of a BS for supporting an overlay mode in a wireless communication system according to an exemplary embodiment of the present invention.

Referring to FIG. 5, the BS transmits the configuration information of every FA using the broadcast channel or the broadcast message on the periodic basis or according to an event triggering in step 500.

If the MS stores the configuration information of every FA as the table, the BS does not have to broadcast the configuration information of every FA using the broadcast message.

When recognizing that the corresponding MS supports the overlay mode in the network entry procedure with the corresponding MS, the BS allocates the multiple FAs to be used by the MS in the overlay mode in step 502. The process for the recognizing of the MS supporting the overlay mode corresponds to the basic capability negotiation of the network entry procedure, and may be determined by receiving the SBC-REQ message or the REG-REQ message from the MS. The FA allocation to be used by the MS in the overlay mode may be included in the SBC-RSP message or the REG-RSP message corresponding to a response message of the SBC-REQ message or the REG-REQ message. The SBC-RSP message or the REG-RSP message transmitted from the BS may include allocation information (the FA index and the number of the FAs allocated to the MS, and the overlay mode to be used by the MS) of the FAs to be used by the MS, and time information for starting the use of the allocated FA.

In step 504, the BS determines whether the signal informing of the readiness for the data transmission and reception with the BS using the FAs allocated in step 502, is received from the MS. If it is determined in step 504 that the signal informing of the readiness for the data transmission and reception in the overlay mode from the MS is received, the BS transmits and receives data with the MS over the allocated FAs in step 506.

Next, the BS finishes this process.

In FIGS. 4 and 5, the MS supporting the overlay mode is allocated with the FAs to use from the BS in the process of the network entry, acquires detailed information of the allocated FAs from the configuration information, and then informs of its readiness for the allocated FAs. That is, it has been explained that every FA allocated is the FA actually used for the MS and the BS to transmit and receive the data.

Figure 6:
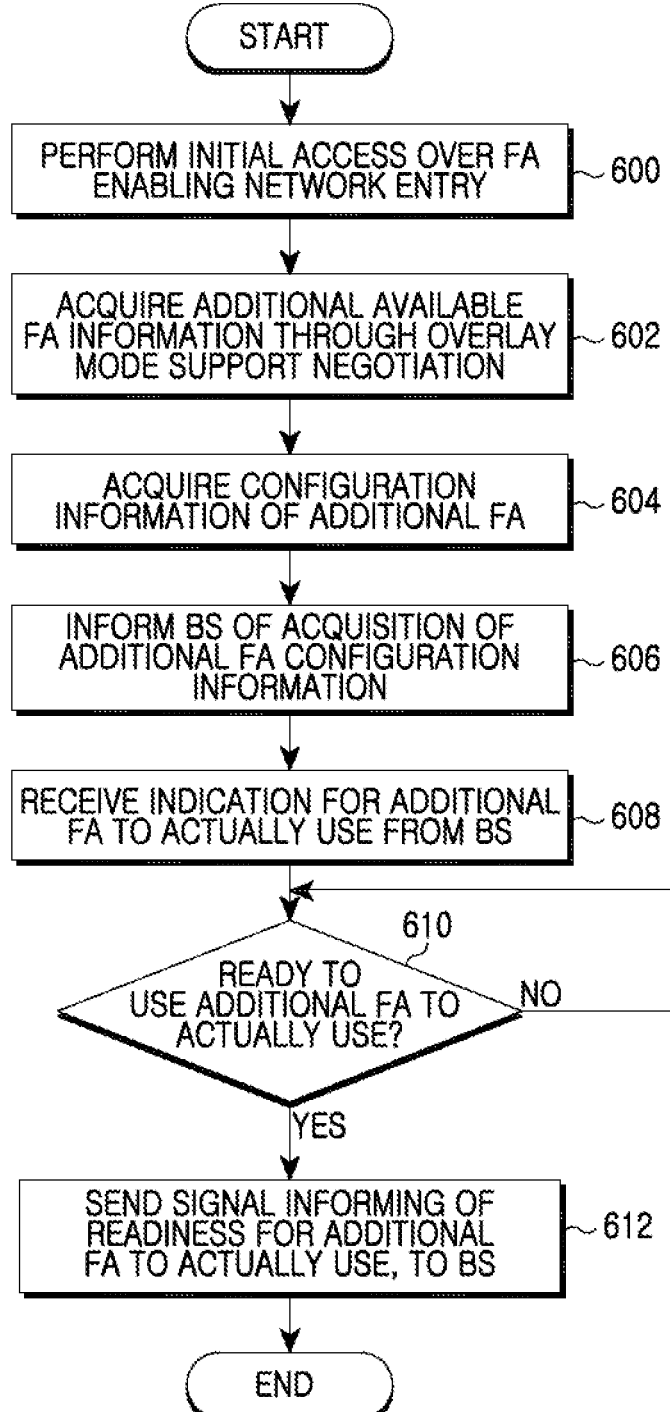
FIG. 6 is a flowchart of operations of an MS for supporting an overlay mode in a wireless communication system according to an exemplary embodiment of the present invention.
Figure 7:
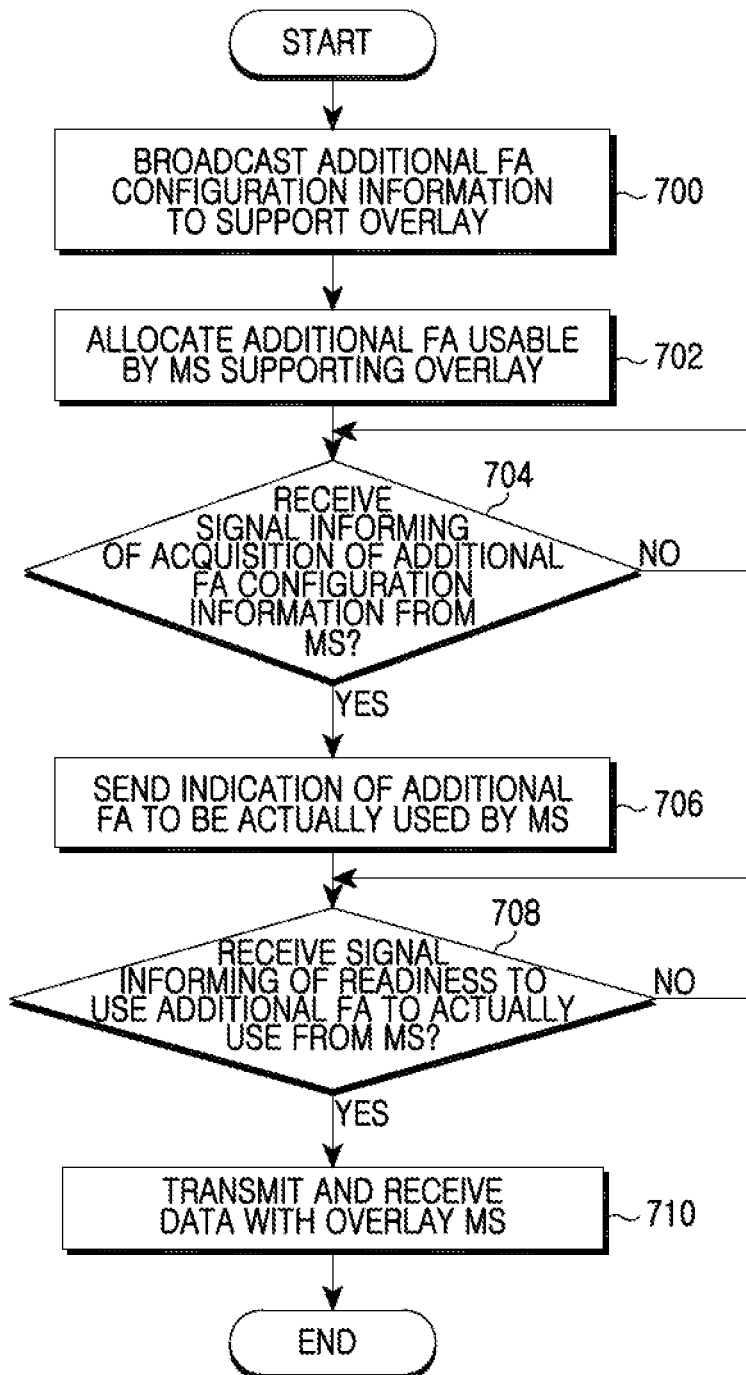
FIG. 7 is a flowchart of operations of a BS for supporting an overlay mode in a wireless communication system according to an exemplary embodiment of the present invention.

When the BS separately designates the FA to use among the allocated FAs according to the situation without having to use all of the allocated FAs for the data transmission and reception of the MS and the BS, an exemplary method for utilizing the configuration information is illustrated in FIGS. 6 and 7.

FIG. 6 is a flowchart of operations of an MS for supporting an overlay mode in a wireless communication system according to an exemplary embodiment of the present invention.

Referring to FIG. 6, in step 600 the MS executes the network entry procedure by searching for the FA for the network entry.

During a network entry, the MS acquires available FA information in the overlay mode with the BS by performing the overlay mode support negotiation procedure in step 602. The FA information includes a number of the FAs supportable by the MS, the overlay mode supported by the MS, and the FA index information to be used by the MS. Herein, step 602 is the same as step 404.

In step 604, the MS acquires the configuration information of every FA managed by the BS through the broadcast channel or the broadcast message transmitted from the BS. The configuration information of the FA may include the physical carrier index information of the FA, the center frequency of the FA, the bandwidth of the FA, and the offset information of the FA. The configuration information acquisition of every FA managed by the BS in step 604 can precede step 602.

In step 606, the MS receiving the configuration information transmits a signal to the BS to inform of the reception of the configuration information. The signal may inform the readiness to use the FAs allocated from the BS in the overlay mode support if the allocated FAs are used the FA (i.e., the active FA) to be actually used by the BS. While the MS acquires the configuration information of the FAs managed by the BS in step 604, the MS may acquire the configuration information of the FAs managed by the BS before step 602. In this case, the MS sends an indicator informing that the configuration information of the FAs is acquired, using the SBC-REQ message or the REG-REQ message transmitted in the overlay mode support negotiation of step 602. When the SBC-REQ message or the REG-REQ message carries the indicator informing that the configuration information of the FAs is acquired, step 606 may be omitted.

When not acquiring the configuration information of the FAs in the process of the overlay mode support negotiation of step 602, the MS sends a relevant indicator using the SBC-REQ message or the REG-REQ message. As receiving the indicator informing that the configuration information of the FAs is not acquired, the BS may transmit the configuration information of the FAs together with the index information of the FA to be used by the MS using the SBC-RSP message or the REG-RSP message. When the SBC-RSP message or the REG-RSP message carries the configuration information of the FA to use, step 604 may be omitted.

In step 608, the MS receives allocation indication for the FA to use in the overlay mode (hereafter, referred to as the active FA) from the BS. The FA allocation indication received in step 608 may include index information of the FA, logical carrier index information of the FA, and use start time information of the FA.

In step 610, the MS prepares to transmit and receive data using the received information of the active FA (e.g., the FA index information). The preparation to transmit and receive data may include the ranging.

Upon completing the preparation to transmit and receive data using the indicated active FA, the MS transmits a signal informing of this to the BS in step 612. The signal transmitted in step 612 is the same as the signal in step 410.

FIG. 7 is a flowchart of operations of a BS for supporting an overlay mode in a wireless communication system according to an exemplary embodiment of the present invention.

Referring to FIG. 7, the BS transmits the configuration information of the FAs managed by itself using the broadcast channel or the broadcast message in step 500. In the network entry with the MS of the overlay mode, the BS allocates an FA usable by the MS in the overlay mode in step 702. The information exchanged between the MS and the BS in step 702 includes a number of the FAs supportable by the MS, the overlay mode of the MS, and the FA index information usable by the MS.

In step 704, the BS determines whether the signal informing of the reception of the configuration information, is received from the MS. Herein, the signal, which is received from the MS in step 704, informing of whether the configuration information of the FAs is received is included in the message received from the MS in step 702, or carried by a separate message other than the message of step 702. When the message received from the MS in step 702 includes the indicator informing of no reception of the FA configuration information, the BS may transmit the configuration information of the FAs to be used by the MS using the message sent to the MS in step 702.

If it is determined in step 704 that the signal informing of the reception of the configuration information is received from the MS, The BS receiving the signal informing of the reception of the configuration information from the MS in step 704, transmits the information (e.g., the FA index) of the active FA to be used by the MS in the overlay mode in step 706. The message sent to the MS in step 706 may include use start time information of the active FA besides the index of the active FA.

In step 708, the BS determines whether the signal informing of the readiness to use the allocated active FA is received from the MS. If it is determined in step 708 that the signal informing of the readiness of the MS to transmit and receive data over the active FA is received, the BS transmits and receives data to and from the MS over the FA in step 710.

While the active FA information transmitted from the BS to the MS in step 706 may be the same as the FA allocated in step 702, the active FA information can include a new FA not allocated in step 702. The configuration information of the new FA unallocated in step 702 may be acquired from the FA configuration information transmitted by the BS in step 700. Alternatively, the message sent from the BS to the MS in step 706 may carry the configuration information of the new FA together with an index of the new active FA.

Figure 8:
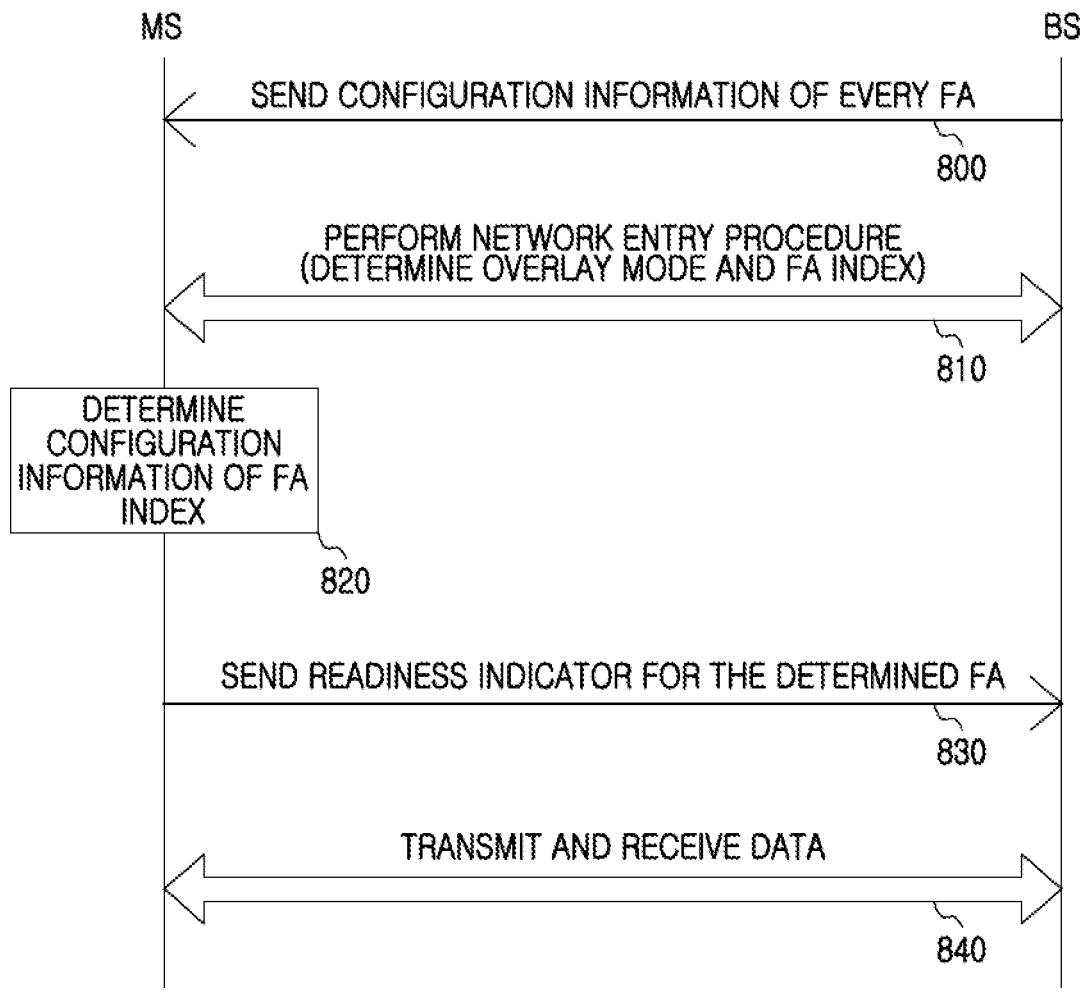
FIG. 8 is a flowchart of a method for supporting an overlay mode in a wireless communication system according to an exemplary embodiment of the present invention.

FIG. 8 is a flowchart of a method for supporting an overlay mode in a wireless communication system according to an exemplary embodiment of the present invention.

Referring to FIG. 8, the BS transmits the configuration information of every FA over the broadcast channel according to the triggering event or on the periodic basis in step 800.

The MS and the BS negotiate for the overlay mode execution during the network entry procedure and determine the FA index for the overlay mode when determining the overlay mode in step 810.

Step 800 and step 810 are independent of each other. Before the receiving of the configuration information of every FA, the MS may receive the FA index for the overlay mode.

When receiving both of the FA index for the overlay mode and the corresponding configuration information, the MS uses the FA configuration information corresponding to the FA index supporting the overlay mode in step 820 and sends the readiness indicator message for the determined overlay mode to the BS in step 830.

Next, the MS transmits and receives data to and from the BS using the determined FA in step 840.

Figure 9:
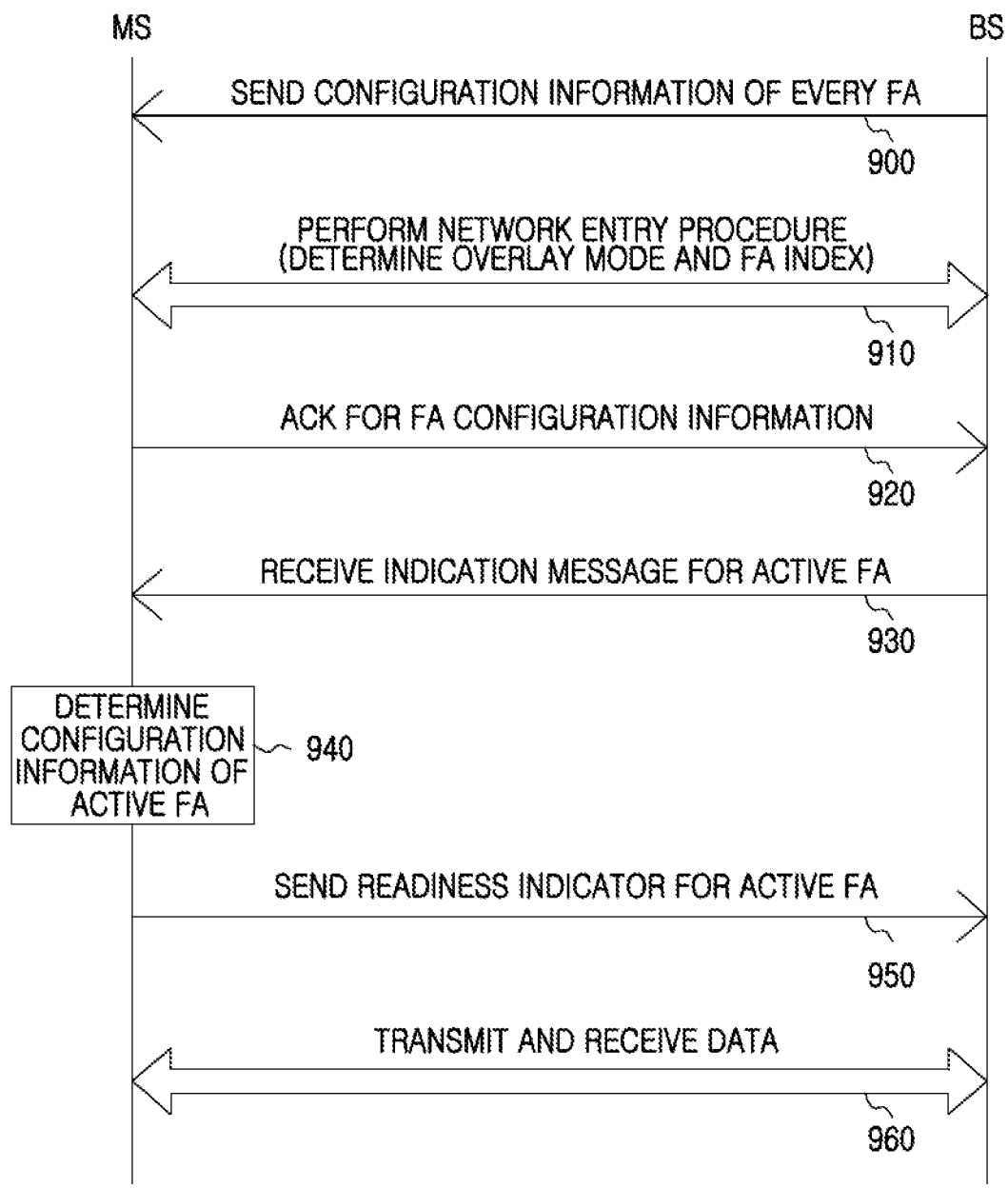
FIG. 9 is a flowchart of a method for supporting an overlay mode in a wireless communication system according to an exemplary embodiment of the present invention.

FIG. 9 is a flowchart of a method for supporting an overlay mode in a wireless communication system according to an exemplary embodiment of the present invention.

Referring to FIG. 9, the BS transmits the configuration information of every FA over the broadcast channel according to the triggering event or on the periodic basis in step 900.

The MS and the BS negotiate for the overlay mode execution during the network entry procedure and determine the FA index for the overlay mode when determining the overlay mode in step 910.

Step 900 and step 910 are independent of each other. Before receiving the configuration information of every FA, the MS may perform the negotiation for the overlay mode execution and receive the FA index for the overlay mode.

When receiving the configuration information of every FA from the BS, the MS sends an ACKnowledgement (ACK) message to the BS in step 920.

Upon receiving the ACK message, the BS sends the indication message for the active FA to the MS in step 930. The MS determines the FA configuration information corresponding to the active FA in step 940 and sends the readiness indicator message for the active FA to the BS in step 950.

Next, the MS transmits and receives data to and from the BS using the active FA in step 960.

Figure 10:
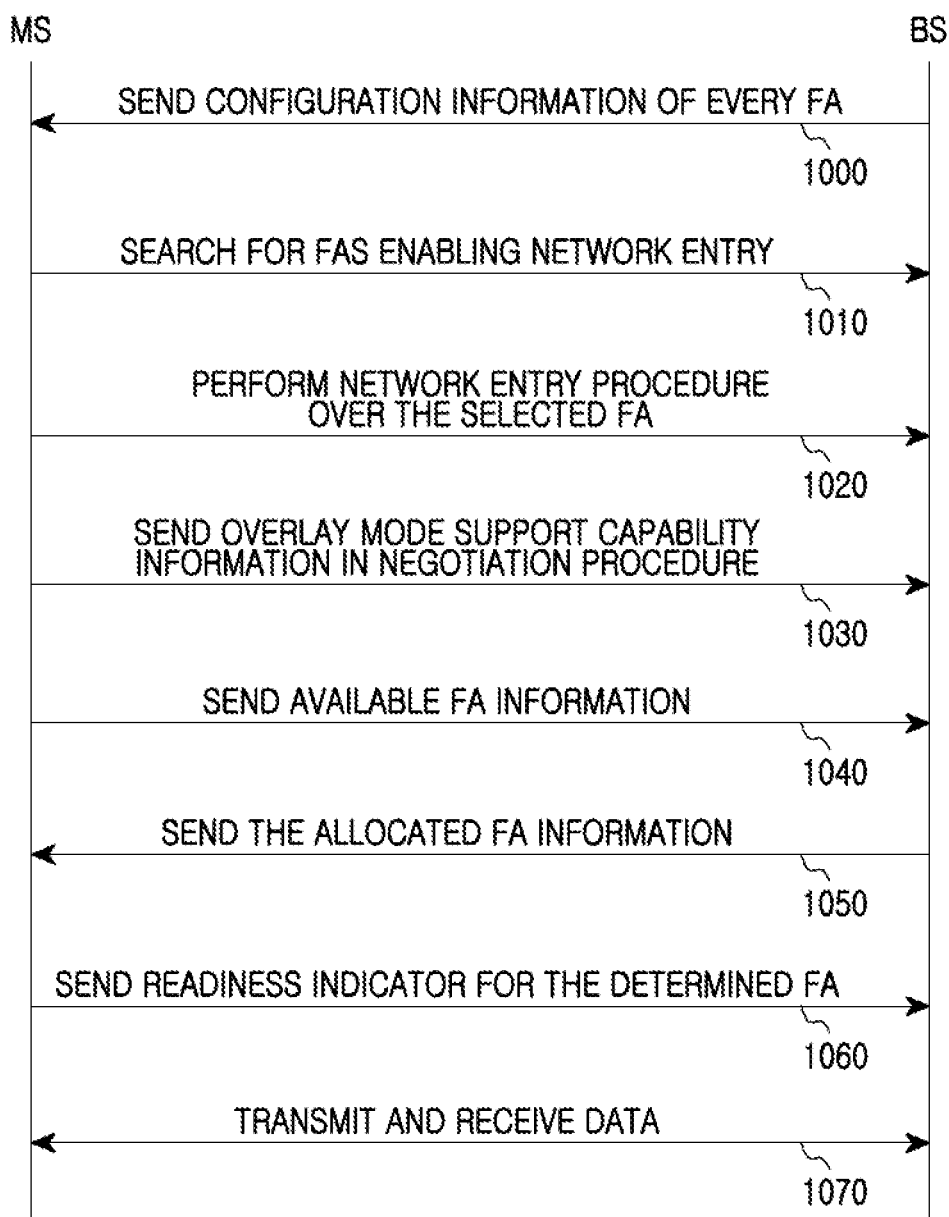
FIG. 10 is a flowchart of a method for supporting an overlay mode in a wireless communication system according to an exemplary embodiment of the present invention.

FIG. 10 is a flowchart of a method for supporting an overlay mode in a wireless communication system according to an exemplary embodiment of the present invention.

Referring to FIG. 10, the BS transmits the configuration information of every FA over the broadcast channel according to the triggering event or on the periodic basis in step 1000.

The MS searches for the FA for the network entry in step 1010 and performs the network entry procedure with the BS over the found FA in step 1020. In the basic capability negotiation of the network entry, the MS sends the message including the overlay mode support information in step 1030. The message in step 1030 includes the overlay mode supported by the MS, and can include the indicator information informing of whether the MS receives the configuration information of the multiple FAs broadcast from the BS in step 1000.

Upon receiving the FA configuration information from the BS in step 1000, the MS selects the available FA among the FAs of the FA configuration information based on the MS support capability and the requirements of the MS and sends the message including the selected FA information to the BS in step 1040. The message sent in step 1040 includes the index information of the FA selected by the MS.

In step 1050, the BS selects the FA to allocate to the MS based on the overlay support capability information and the MS available FA information received in step 1030 and step 1040 and the FA state of the BS, and sends the message including the FA information to the MS. The message of step 1050 includes the index information of the FA allocated to the MS and the start time information for using the allocated FA.

The messages sent in step 1040 and step 1050 are the messages delivered between the MS and the BS in the basic capability negotiation of step 1030, or separate messages. If the messages in step 1040 and step 1050 are separate messages, the steps after step 1040 are performed after the network entry procedure between the BS and the MS is completed.

The MS receiving the FA information allocated from the BS transmits the signal informing of its readiness to transmit and receive data using the FA to the BS in step 1060. The BS transmits and receives data to and from the MS over the FA in step 1070.

Figure 11:
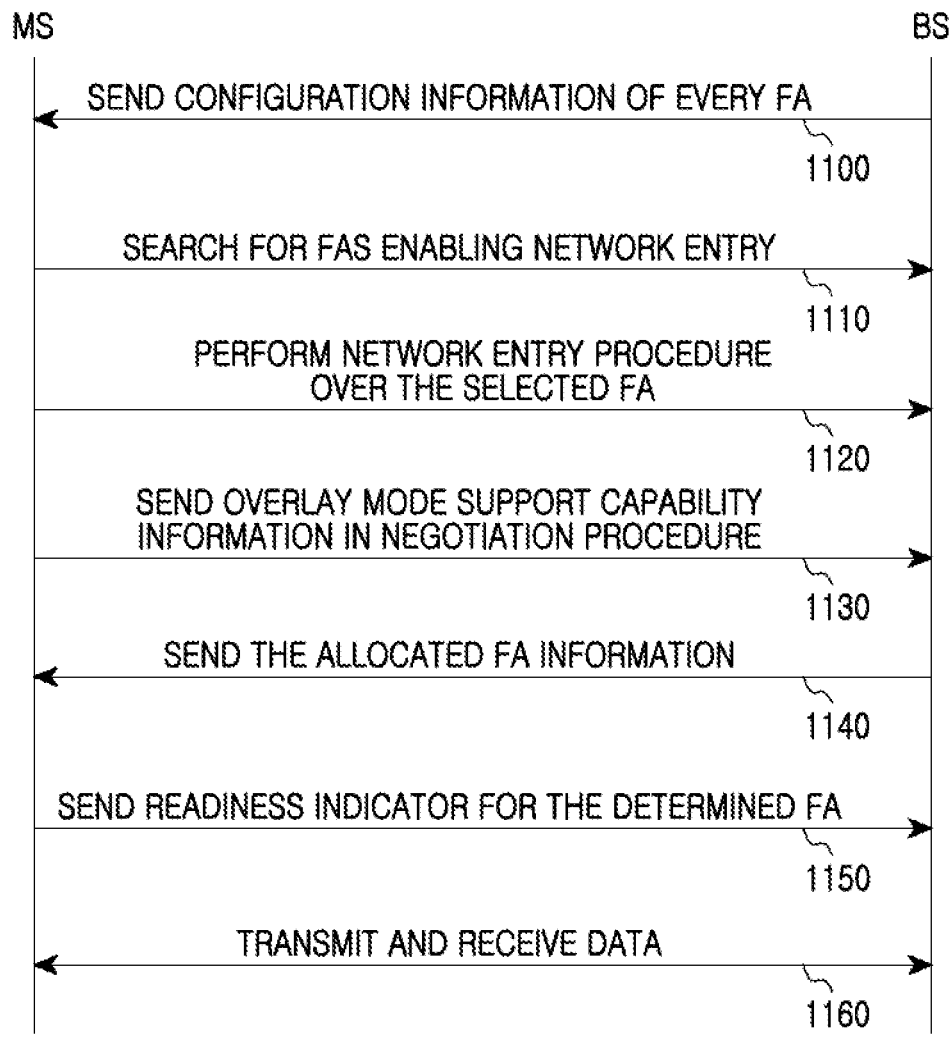
FIG. 11 is a flowchart of a method for supporting an overlay mode in a wireless communication system according to an exemplary embodiment of the present invention.

FIG. 11 is a flowchart of a method for supporting an overlay mode in a wireless communication system according to an exemplary embodiment of the present invention.

Referring to FIG. 11, the BS transmits the configuration information of every FA over the broadcast channel according to the triggering event or on the periodic basis in step 1100.

The MS searches for the FA for the network entry in step 1110 and performs the network entry procedure with the BS over the found FA in step 1120. In the basic capability negotiation of the network entry procedure, the MS sends the message including the overlay mode support information in step 1130. The message in step 1130 includes the detailed overlay mode support information, for example, the overlay mode supported by the MS, the bandwidth information supportable by the MS, the inter-FA interval supportable by the MS, the FA number information supportable by the MS. The message in step 1130 may include the indicator information informing of whether the MS receives the configuration information of the FAs broadcast from the BS in step 1100.

When the network entry procedure between the MS and the BS is finished, the BS selects the FA to allocate to the MS based on the overlay support capability information received in step 1130 and the FA state of the BS, and sends the message including the FA information to the MS in step 1140. The message in step 1140 includes the index information of the FA allocated to the MS and the start time information for using the allocated FA. The message sent in step 1140 may include the configuration information of the allocated FA.

The MS receiving the FA information allocated from the BS transmits the signal informing of its readiness to transmit and receive data using the FA to the BS in step 1150. The BS transmits and receives data to and from the MS over the FA in step 1160.

Figure 12:
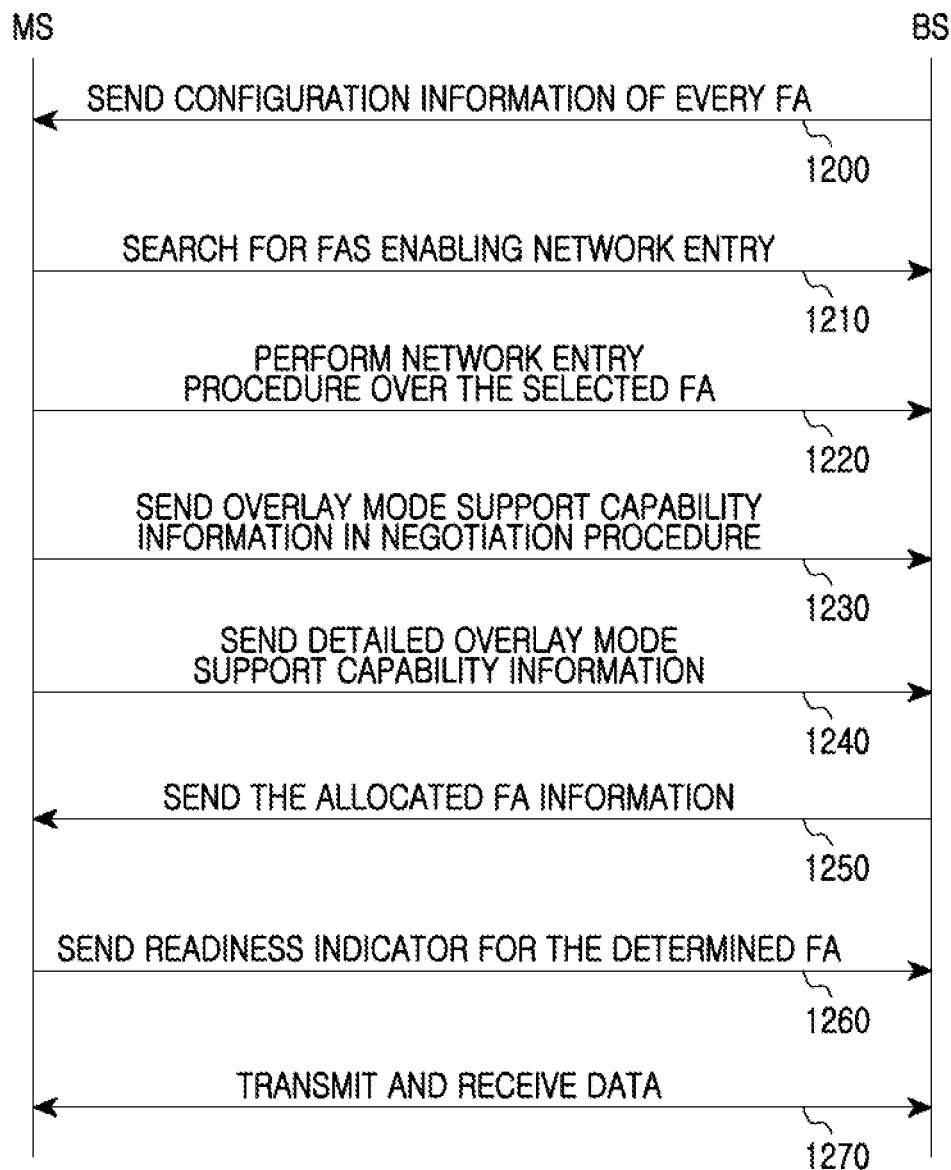
FIG. 12 is a flowchart of a method for supporting an overlay mode in a wireless communication system according to an exemplary embodiment of the present invention.

FIG. 12 is a flowchart of a method for supporting an overlay mode in a wireless communication system according to an exemplary embodiment of the present invention.

Referring to FIG. 12, the BS transmits the configuration information of every FA over the broadcast channel according to the triggering event or on the periodic basis in step 1200.

The MS searches for the FA for the network entry in step 1210 and performs the network entry procedure with the BS over the found FA in step 1220. In the basic capability negotiation of the network entry procedure, the MS sends the message including the overlay mode support information in step 1230. The overlay mode support information of step 1230 includes the information indicating whether or not the MS supports the overlay mode.

After completing the network entry procedure, the MS sends a message including the additional overlay mode support capability information to the BS in step 1240. The message of step 1240 includes the detailed overlay mode support information, for example, the overlay mode supported by the MS, the bandwidth information supportable by the MS, the inter-FA interval (interval between two FAs in frequency domain) supportable by the MS, the FA number information supportable by the MS. The message in step 1240 can include the indicator information informing of whether the MS receives the FA configuration information from the BS in step 1200.

In step 1250, the BS selects the FA to allocate to the MS based on the overlay support capability information received in step 1240 and the FA state of the BS, and sends the message including the FA information to the MS. The message in step 1250 includes the index information of the FA allocated to the MS and the start time information for using the allocated FA. The message in step 1250 can include the configuration information of the allocated FA.

The MS receiving the FA information allocated from the BS transmits the signal informing of its readiness to transmit and receive data using the FA to the BS in step 1260. The BS transmits and receives data to and from the MS over the FA in step 1270.

Figure 13:
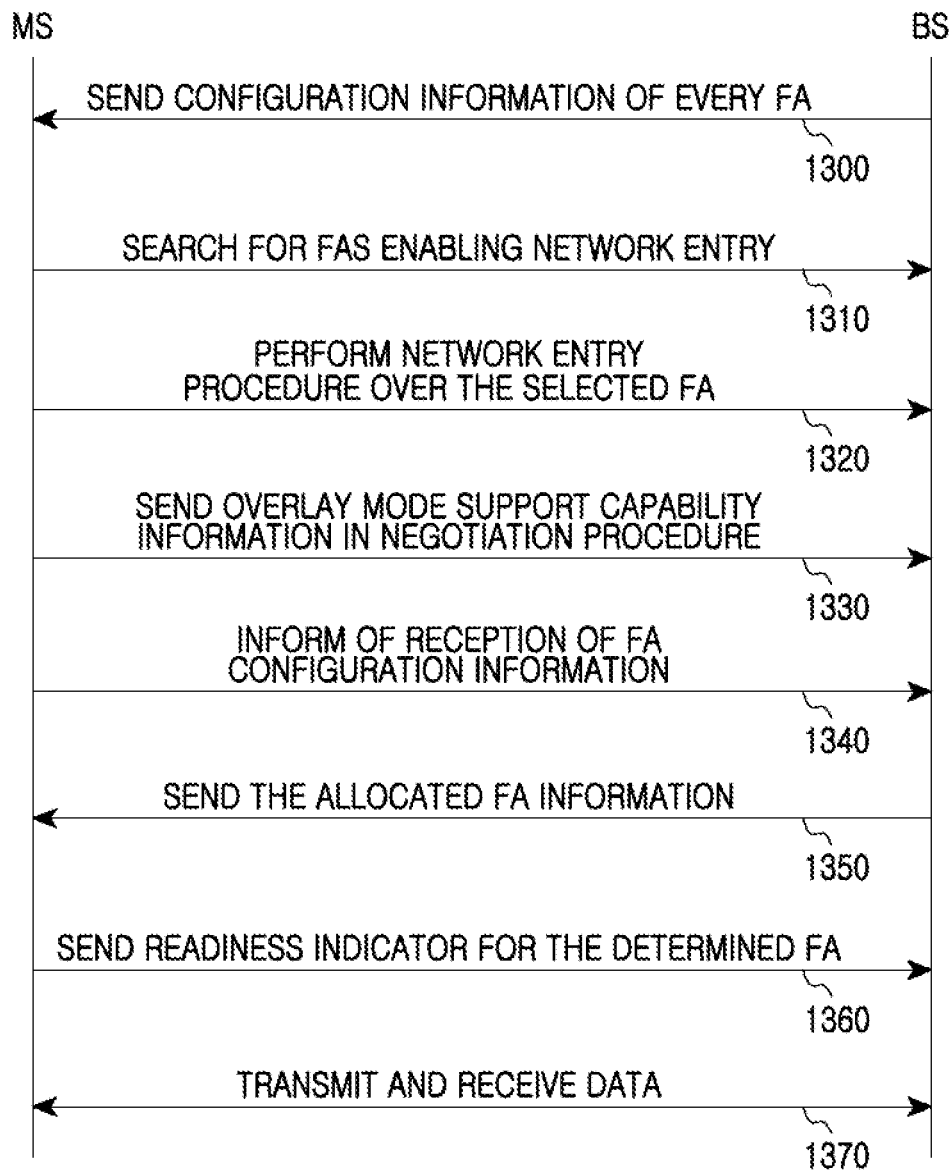
FIG. 13 is a flowchart of a method for supporting an overlay mode in a wireless communication system according to an exemplary embodiment of the present invention.

FIG. 13 is a flowchart of a method for supporting an overlay mode in a wireless communication system according to an exemplary embodiment of the present invention.

Referring to FIG. 13, the BS transmits the configuration information of every FA over the broadcast channel according to the triggering event or on the periodic basis in step 1300.

The MS searches for the FA for the network entry in step 1310 and performs the network entry procedure with the BS over the found FA in step 1320. In the basic capability negotiation of the network entry procedure, the MS sends the message including the overlay mode support information in step 1330. The message in step 1330 includes the overlay mode supported by the MS, the bandwidth information supportable by the MS, the inter-FA interval (interval between two FAs in frequency domain) supportable by the MS, and the FA number information supportable by the MS. As the overlay mode support information of the MS is delivered in step 1330, the MS and the BS negotiates on whether to use the overlay mode.

When determining to use the overlay mode, the MS sends a message informing of whether the MS receives the configuration information of the multiple FAs from the BS in step 1300, in step 1340. The message of step 1340 includes FA configuration information reception indicator information, and can be a MAC layer control message or a MAC layer header, or a signal piggybacked on other message.

After receiving the message informing of the reception of the FA configuration information from the MS in step 1340, the BS selects the FA to allocate to the MS based on the overlay support capability information received in step 1330 and the FA state of the BS, and sends the message including the FA information to the MS in step 1350. The message in step 1350 includes the index information of the FA allocated to the MS and the start time information for using the allocated FA.

The MS receiving the FA information allocated from the BS transmits the signal informing of its readiness to transmit and receive data using the FA to the BS in step 1360. The BS transmits and receives data to and from the MS over the FA in step 1370.

In FIGS. 10, 11, 12, and 13, it is assumed that the FAs allocated by the FA are used for the MS to transmit and receive the data with the BS while the MS stays in the overlay mode. If the BS designates the FA to use among the allocated FAs according to the situation, steps 930 through 950 of FIG. 9 may be added between the BS and the MS.

As set forth above, the BS transmits the configuration information of every FA over the broadcast channel and sends only the corresponding FA index in the overlay mode support negotiation in the wireless communication system. Therefore, a large amount of data can be transmitted and received efficiently.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a terminal in a wireless communication system, the method comprising:
    receiving, from a base station (BS), a first message including information on a plurality of frequency bands;
    generating a second message including information on at least one band combination supported by the terminal, wherein the at least one band combination consists of at least one frequency band among the plurality of frequency bands, and is determined by the terminal based on an ordering of the information on the plurality of frequency bands in the first message; and
    transmitting, to the BS, the second message including the information on the at least one band combination determined by the terminal.

2. The method of claim 1, wherein the second message further includes information for informing of a capability of the terminal.

3. The method of claim 1, further comprising:
    identifying at least one frequency position for synchronization with the BS; and
    performing an initial access with the BS based on the at least one frequency position.

4. The method of claim 1, further comprising:
    receiving, from the BS, allocation information for the at least one band combination; and
    receiving data through the at least one band combination,
    wherein the first message further includes at least one of indices of the plurality of frequency bands, center frequencies of the plurality of frequency bands, bandwidths of the plurality of frequency bands, or offset information of the plurality of frequency bands.

5. A method performed by a base station (BS) in a wireless communication system, the method comprising:
    transmitting, to a terminal, a first message including information on a plurality of frequency bands; and
    receiving, from the terminal, a second message including the information on at least one band combination,
    wherein the second message includes information on the at least one band combination supported by the terminal,
    wherein the at least one band combination consists of at least one frequency band among the plurality of frequency bands, and
    wherein the at least one band combination is determined by the terminal based on an ordering of the information on the plurality of frequency bands in the first message.

6. The method of claim 5, wherein the second message further includes information for informing of a capability of the terminal.

7. The method of claim 5, further comprising:
    performing an initial access with the terminal based on at least one frequency position for synchronization with the terminal,
    wherein the at least one frequency position is identified by the terminal.

8. The method of claim 5, further comprising:
    transmitting, to the terminal, allocation information for the at least one band combination; and
    transmitting data through the at least one band combination,
    wherein the first message further includes at least one of indices of the plurality of frequency bands, center frequencies of the plurality of frequency bands, bandwidths of the plurality of frequency bands, or offset information of the plurality of frequency bands.

9. A terminal in a wireless communication system, the terminal comprising:
    a transceiver; and
    a controller coupled with the transceiver, and configured to:
        receive, from a base station (BS), a first message including information on a plurality of frequency bands,
        generate a second message including information on at least one band combination supported by the terminal, wherein the at least one band combination consists of at least one frequency band among the plurality of frequency bands, and is determined by the terminal based on an ordering of the information on the plurality of frequency bands in the first message, and
        transmit, to the BS, the second message including the information on the at least one band combination determined by the terminal.

10. The terminal of claim 9, wherein the second message further includes information for informing of a capability of the terminal.

11. The terminal of claim 9, wherein the controller is further configured to:
    identify at least one frequency position for synchronization with the BS, and
    perform an initial access with the BS based on the at least one frequency position.

12. The terminal of claim 9,
    wherein the controller is further configured to:
        receive, from the BS, allocation information for the at least one band combination, and
        receive data through the at least one band combination, and
    wherein the first message further includes at least one of indices of the plurality of frequency bands, center frequencies of the plurality of frequency bands, bandwidths of the plurality of frequency bands, or offset information of the plurality of frequency bands.

13. A base station (BS) in a wireless communication system, the BS comprising:
    a transceiver; and
    a controller coupled with the transceiver, and configured to:
        transmit, to a terminal, a first message including information on a plurality of frequency bands, and
        receive, from the terminal, a second message including the information on at least one band combination, wherein the second message includes information on the at least one band combination supported by the terminal, wherein the at least one band combination consists of at least one frequency band among the plurality of frequency bands, and wherein the at least one band combination is determined by the terminal based on an ordering of the information on the plurality of frequency bands in the first message.

14. The BS of claim 13, wherein the second message further includes information for informing of a capability of the terminal.

15. The BS of claim 13,
wherein the controller is further configured to:
perform an initial access with the terminal based on at least one frequency position for synchronization with the terminal, and
wherein the at least one frequency position is identified by the terminal.

16. The BS of claim 13,
wherein the controller is further configured to:
transmit, to the terminal, allocation information for the at least one band combination, and
transmit data through the at least one band combination, and
wherein the first message further includes at least one of indices of the plurality of frequency bands, center frequencies of the plurality of frequency bands, bandwidths of the plurality of frequency bands, or offset information of the plurality of frequency bands.

* * * * *